Figure 1:
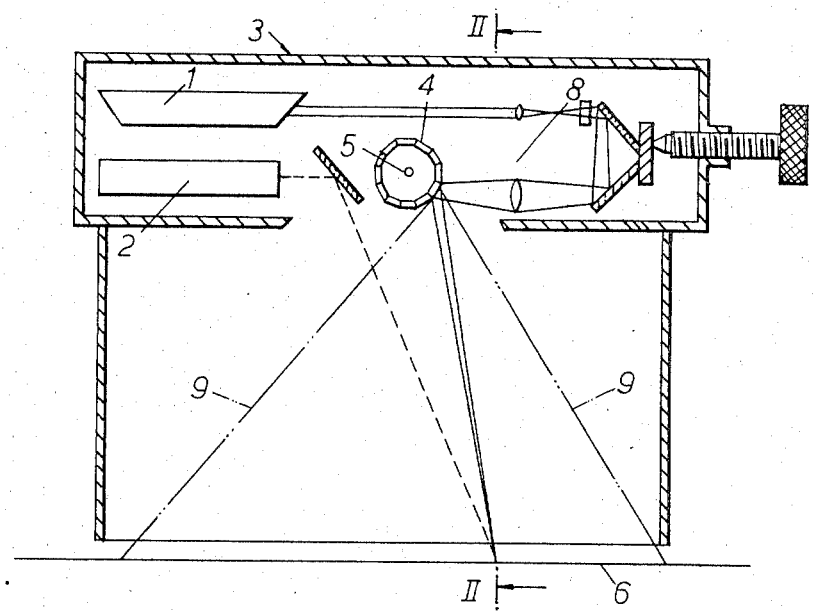

United States Patent [19]
Clarke

[11] 3,804,534
[45] Apr. 16, 1974

[54] DETECTION OF BLEMISHES IN A SURFACE
[75] Inventor: Graham Morley Clarke, Edinburgh, Scotland
[73] Assignee: Ferranti Limited, Hollinwood, Lancashire, England
[22] Filed: Oct. 25, 1972
[21] Appl. No.: 300,568

Related U.S. Application Data
[63] Continuation-in-part of Ser. No. 226,466, Feb. 15, 1972.

[30] Foreign Application Priority Data
Oct. 27, 1971  Great Britain ................49885/71

[52] U.S. Cl.................. 356/237, 356/201, 356/209
[51] Int. Cl. ......................................... G01n 21/32
[58] Field of Search ........... 356/201, 209, 237, 239

[56]         References Cited
            UNITED STATES PATENTS
3,652,863    3/1972   Gaskell et al. ...................... 356/239

Primary Examiner—William L. Sikes
Attorney, Agent, or Firm—Cameron, Kerkam, Sutton, Stowell & Stowell

[57]            ABSTRACT

A detector of blemishes in a surface includes a scanning station able to move relative to the surface, the scanning station comprising a laser capable of emitting a continuous beam of radiation, optical means for focussing the radiation from the laser such that the radiation intersects the surface as a line extending parallel to the direction of said relative motion, scanning means for causing the beam to scan the surface perpendicular to the direction of said relative motion and detection means, responsive to the detection of changes in radiation diffusely reflected from, or transmitted by, the surface, to produce an output signal. The intersection of the surface by the radiation as a line enables the surface to be moved past the scanning station at an increased speed while permitting a representative proportion of the surface to be scanned by the radiation.

9 Claims, 12 Drawing Figures

DETECTION OF BLEMISHES IN A SURFACE

RELATED APPLICATIONS

This application is a continuation-in-part of copending application Ser. No. 226,466 filed 15, Feb. 1972.

This invention relates to the detection of blemishes in surfaces.

Detectors of blemishes are available employing high intensity lamps and photodetectors. The intensities of the lamps involved, usually xenon lamps, are frequently such that the power consumption is measured in kilowatts, but the sensitivity required of the detector in detecting blemishes which are small, even though clearly visible to the unaided eye, is not obtainable. It is known to focus the output of a lamp onto a moving surface, means being provided to cause the beam to scan the moving surface transversely to its direction of movement. Reflected light from the surface is collected and detected by a photomultiplier tube, a variation in the detected level indicating a change in intensity of the reflected light resulting from a blemished surface.

However, even when using a high intensity source of, say, the xenon kind, it is only possible to focus a small proportion of the light energy onto the surface. It is therefore necessary to obtain light from a relatively large area of, say, two square millimetres to obtain an output signal from the detector greater than any electrical noise associated with the photomultiplier tube. Because of the necessity to focus the light into a "large" area, the edges of the image are not well-defined and discrimination between a large blemish and several small blemishes is impossible.

An alternative method is to scan the surface with a fully-focussed laser beam. This results in a smaller illuminated area so that any blemish occupies a greater proportion of the spot area, thereby giving a greater contrast and improving the certainty with which the blemish is detected.

The occurrence of blemishes in the surface may be shown to follow a definite statistical variation, so that if a large number of blemishes are known or expected to be present, it is possible to count those occuring in a specific area of the surface and calculate the total number for the whole surface. This may be done by moving the surface at such a speed that successive scans cross the surface separated by about 10 times the width of a single scanned area, which speed is comparable with the surface speed of non-laser forms of detectors. However, at surface speeds greatly in excess of this the statistical variation of the occurrence of blemishes becomes unreliable unless the ratio of scanned to unscanned areas of surface remains the same.

It is an object of the present invention to provide a detector of blemishes in a surface moving relative to the detector at a higher speed than has previously been usable.

According to the present invention a detector of blemishes in a surface includes a scanning station movable relative to the surface, the scanning station comprising a laser, capable of emitting a continuous beam of radiation, an optical system having different focal lengths in two orthogonal planes, one of which extends parallel to the direction of said relative motion, and having means arranged to focus the beam onto the surface in the other one of said orthogonal planes, scanning means, including reflector means rotatable in the path of the beam and operable to cause the beam to scan the surface perpendicular to said one plane and detection means responsive to changes in the intensity of received radiation diffusely reflected from, or transmitted by, the surface to provide an output signal.

Although this invention is primarily concerned with detectors operating with electromagnetic radiation in the visible part of the spectrum, the detector may include a laser emitting infra-red or ultra-violet radiation and detection means for detecting such radiation. For convenience hereinafter in this specification the radiation emitted by the laser will be referred to as "optical radiation" or "light."

Conveniently, the scanning means is a rotatable mirror having a plurality of reflecting facets.

A plurality of scanning stations may be positioned adjacent each other to give an increased number of scans in any particular length of surface at any given surface speed and scanning speed. A plurality of scanning stations may be positioned adjacent each other perpendicular to the direction of movement of the surface to allow a shorter scan length for each station.

Figure 2:
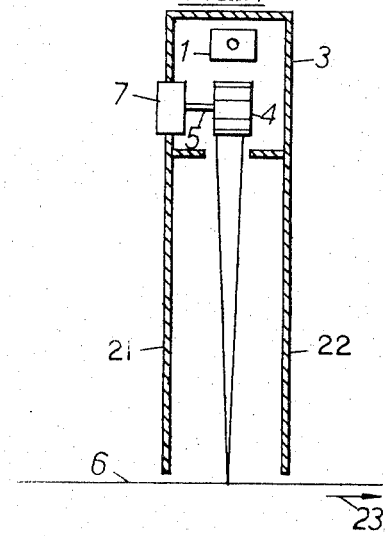
Figure 3:
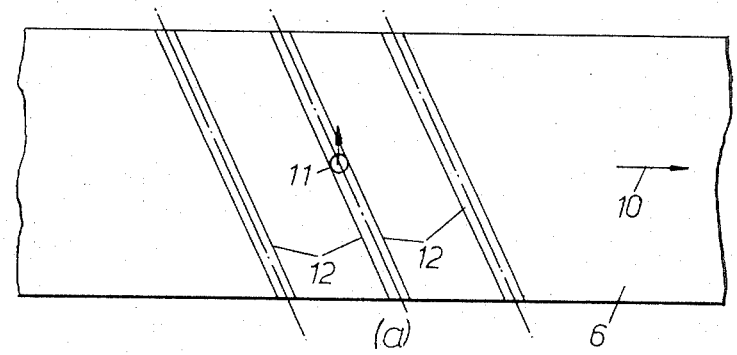
Figure 3:
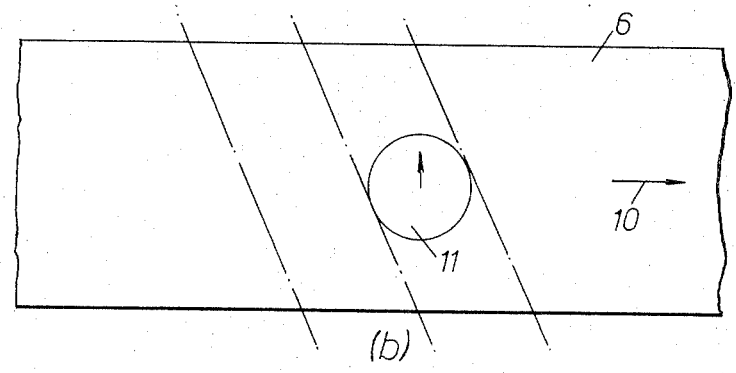
Figure 3:
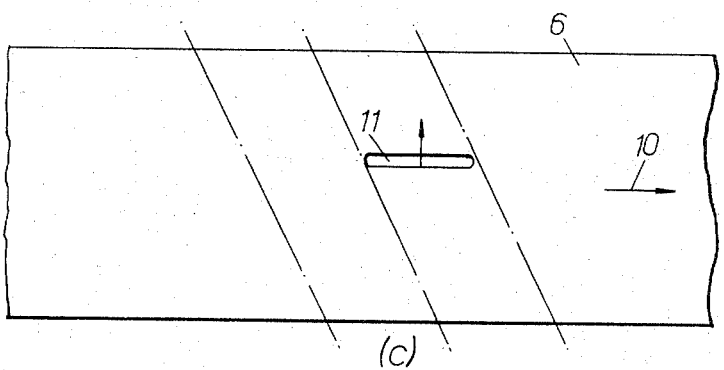
Figure 4:
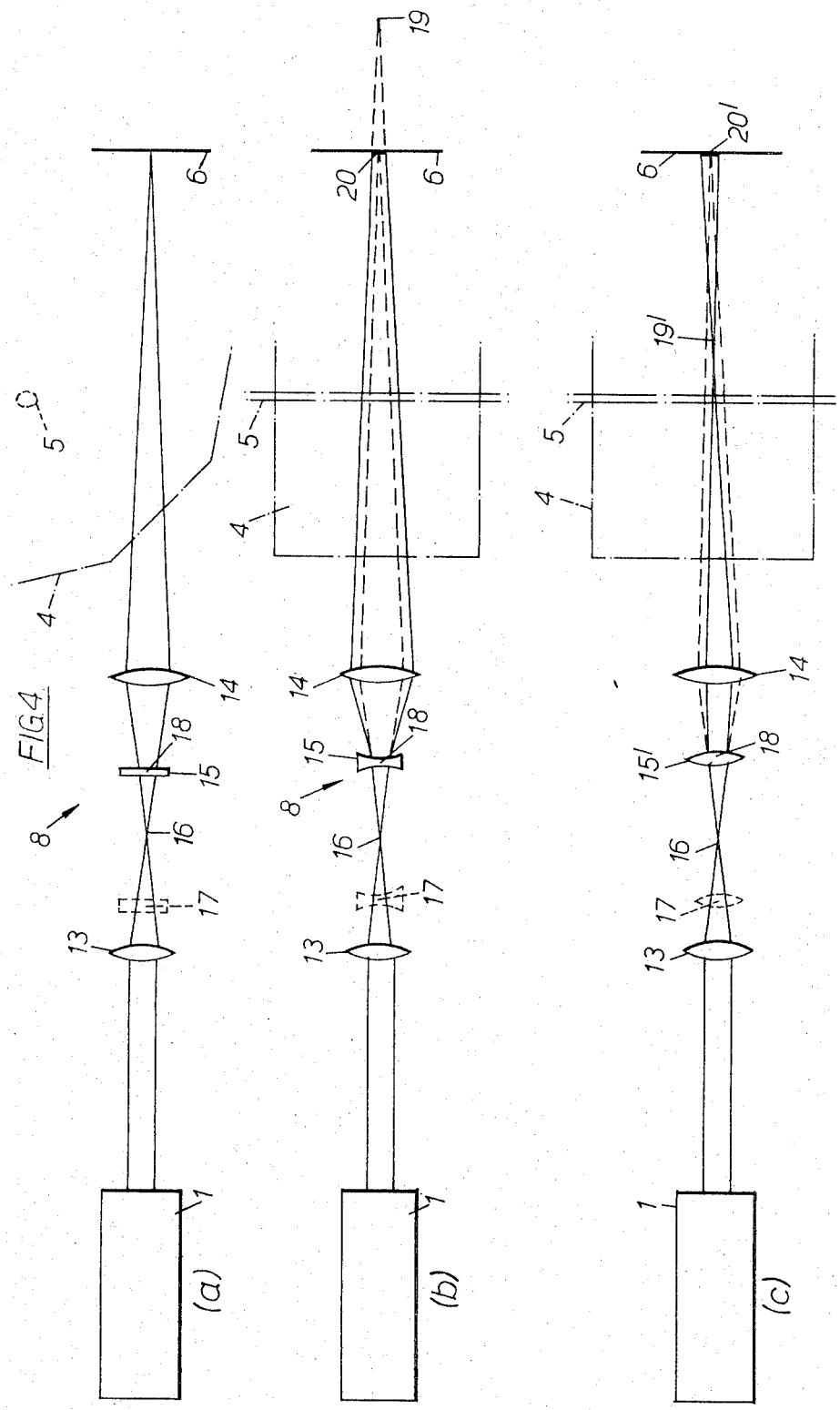
Figure 5:
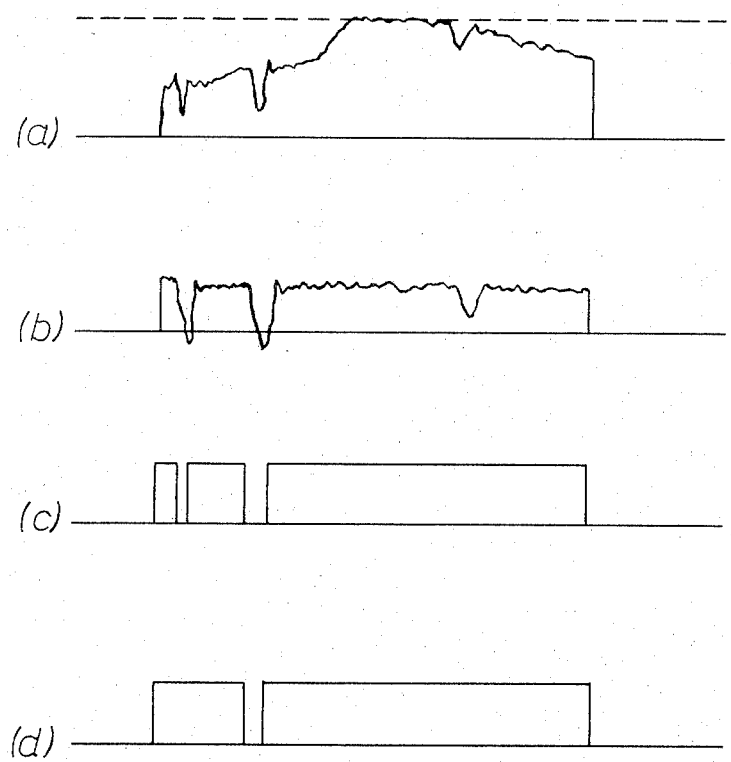

The present invention will now be described by way of example with reference to the accompanying drawings in which:

FIG. 1 is a sectional elevation of one embodiment of the blemish detector according to the present invention, FIG. 2 is a sectional elevation of the blemish detector taken along the line II — II of FIG. 1, FIGS. 3(a), 3(b) and 3(c) show plan views of the surface and areas covered by the beam, FIGS. 4(a), 4(b) and 4(c) show elevation and plan views of the optical system, and FIGS. 5a to 5d show waveforms of signals received by the detection means at different stages of the measurement of the number of blemishes.

The blemish detector illustrated in section in FIG. 1 comprises a laser 1 and photomultiplier detection means 2 mounted adjacent each other at one end of a scanning station 3. At the centre of the scanning station 3 adjacent an opening is a rotatable twelve-faceted mirror 4. The mirror is mounted on a spindle 5, which spindle lies parallel to the direction of motion of a moving surface 6, and is driven by a motor 7 (shown in FIG. 2), at a constant speed. The mirror is positioned in the scanning station 3 such that in operation, light emitted by the laser 1 and passed through an optical system 8 (located at the end of the scanning station and described in detail hereinafter) strikes one of the facets, from which it is reflected towards the moving surface 6. The direction of motion of this surface 6 is perpendicular to the plane of the drawing. The optical system 8 converts the essentially parallel-sided beam emerging from the laser into one converging towards the surface 6. As the facet of the mirror 4 reflecting the converging beam is caused to rotate, and reflected beam is caused to scan across the surface perpendicular to its direction of motion and between limits shown by the broken lines 9 enclosing an angle of 60°. The path length of the beam varies throughout the scan, so the beam must have a great depth of focus to produce a sharp image at the surface.

Reflected light from the surface 6 is collected by the photomultiplier detection means 2, either directly or by way of a reflecting system 2'.

With reference to FIG. 3(a), a plan view of the surface 6 is shown, which surface is moving in the direction indicated by the arrow 10. A fully-focussed beam is incident upon the surface as a circular spot 11 which moves across the surface transversely to the direction of motion of the surface. The areas of surface scanned by the image are shown by the narrow strips 12, the spaces between the strips not being scanned at all. The width of such unscanned spaces is dependent upon the speed of the surface. Where it is necessary to detect faults between adjacent scan paths while maintaining the speed of the surface it is necessary to arrange for the "width" of the image to be increased until successive scanned areas are contiguous. A simple solution is illustrated in FIG. 3(b) in which the spot has merely been defocussed to cover the required area in each scan. However, the intensity of the light reaching the surface is reduced to a level at which the sensitivity of the fault detector is comparable with one using a conventional light source, and the undefined edges of the illuminated spot may lead to errors.

The optical system 8 of FIG. 1 is used to cylindrically focus the laser beam. FIG. 3(c) shows the extent of the illuminated area of the surface at 11. The illuminated area is in the form of a line extending in the direction of movement of the surface over a distance that enables successive scans to cover the whole surface but is fully-focussed in the direction of scan, that is, perpendicular to the direction of motion of the surface. As the area of illumination is much smaller than that of the defocussed spot of FIG. 3(b), although slightly larger than the fully-focussed spot of FIG. 3(a), the intensity of the light is maintained at a relatively high value over the area which retains sharply defined edges.

In cases where a 10:1 scanning ratio is sufficient to enable the number of faults to be calculated, then the speed of the surface past the scanning station may be increased by a factor of ten.

The optical system 8 of FIG. 1 is shown in greater detail in FIGS. 4(a) and 4(b) which are elevation and plan views respectively. For convenience of illustration, the diversion of the beam by the mirror 4 is omitted from these Figures although the mirror is shown in outline.

The system 8 comprises two positive (convex) spherical lenses, 13 and 14, and a negative (concave) cylindrical lens 15. Light, emitted from the laser 1 in a parallel sided beam, is brought to a point focus at 16 by the lens 13, from which point it proceeds to diverge towards the lens 14. The lens 14 has a relatively long focal length and an aperture suitable for obtaining the minimum size for the final spot at the surface 6. The cylindrical lens 15 is positioned in the path of the beam between the lenses 13 and 14 with the plane of its curved faces parallel to the spindle 5 about which the mirror 4 rotates.

If the cylindrical lens 15 is placed at the point focus 16 then a circular spot of light will still be produced at the surface. If the lens 15 is displaced along the path of the beam towards one of the positions 17 or 18 (as shown), then the beam in the plane of FIG. 4(b) is caused to diverge slightly as it passes through the lens 15 but the beam in the plane of FIG. 4(a) is unaltered, apart from a small displacement of its apparent point of origin caused by refraction; the displacement is unimportant in that it is constant for any position of the lens. Referring particularly to FIG. 4(b), the beam, after passing through the lens 14 still converges to a point focus, but at 19, beyond the surface 6. At the surface 6, the illuminated area is a line 20 extending parallel to the plane of the lens 15 containing the curved faces, and perpendicular to the direction of scan of the beam. The length of the line 20 is dependent solely upon the displacement of the lens 15 from the point 16 and the orientation of the line on the surface is dependent upon the orientation of the lens 15 about the beam axis.

With reference to FIG. 4(c) it will be seen that a positive (convex) cylindrical lens 15' may be used instead of the negative lens 15. The effect of this lens is to bring the beam to a point focus, in the plane, at 19', before it reaches the surface, after which it proceeds to diverge until it strikes the surface 6 as a line 20'. This arrangement is less efficient than that of FIG. 4(b), because the closer the beam is to being parallel, the greater the depth of focus of the beam.

Alternatively, in an arrangement not shown, either, or both, of the lenses 13 and 14 may have different powers in perpendicular planes, these powers being equalised in one plane to focus the beam fully at the surface and differing in the other plane to give a line.

The end elevation of FIG. 2 shows side walls 21, 22 which are used to prevent stray light from entering the detection means. These help in providing discrimination between the reflected laser light and stray light by narrowing the field of view of the detection means in the direction of motion of the surface, indicated by the arrow 23. An alternative device is a black surface overlaying the surface being scanned except in the vicinity of the scanning beam. These are alternatives or in addition to having a filter over the photomultiplier.

The waveform of a typical signal output from the detection means 2 for a single scan over a surface is shown in FIG. 5(a), with the detail coarsened for clarity. It will be noted that a fall in signal level takes place towards the ends of each scan of approximately half of the centre magnitude. This fall is due to the effect of the inverse square law on the increasing path length of the light towards each end of the scan; and due to the angle from the normal to the surface at which the reflected light is collected, and focussed on the detection means, the amount of light received in the detection means being proportional to the cosine of this angle. A low frequency component of the output signal is fed back to the supply of the detection means to raise the level of the signal obtained at the ends of the scan and to give a constant background output signal level over the whole scan.

The output signal fall-off may be compensated by other methods, including varying the sensitivity of the detection means in synchronism with the scan, for example, by generating a repetitive signal of appropriate characteristics to apply to the detection means; or suitably shaped opaque objects may be placed in the path of the light between the optical system 8 and the detection means 2 so as to intercept more light from the centre of the scan than from the end portions of the scan; or the level at which faults are detected across the scan may be varied by placing a graded density filter in the path of the light reflected from the surface.

Blanking signals, which are adjusted to accommodate different lengths of scan, are triggered at the start of the scan to prevent the detection, as blemishes, of the edges of the surface or the detection of signals from outside these edges.

An exemplary use of the system is for counting the total number of blemishes in various size ranges over a time interval. Counting is easily done with widely used digital techniques, which will not be dealt with in detail here, but reference is made to FIGS. 5(b) to 5(d) which show the waveforms of the output signals received by the detection means at various stages in the counting. Low frequency variations are filtered from the signal (FIG. 5(a)) to leave blemish pulses and background pulses (FIG. 5(b)). All fluctuations below a level set to exclude the background pulses are removed in a comparator which produces pulses of constant height but of varying width for varying blemish sizes. These output pulses are then used to give readings for "total" counting and "large blemish" counting. "Total" counting is achieved by supplying the output of the comparator to displaying decade counters indicating the total number of blemishes in, for example, a ten second period. "Large" blemishes, for example, 0.3 m.m. diameter may be counted by inhibiting the output of the comparator for an appropriate length of time before applying it to the displaying decade counters. The appropriate length of time is that which it takes for the focussed beam at the surface to cross the 0.3 m.m. fault. By inhibiting this output the only pulses to reach the counter and register as blemishes will be those due to blemishes of larger than 0.3 m.m. diameter, which are displayed as for the total count (FIG. 5 (d)). An analogue output may be taken from the counters suitable for a permanent pen recording.

What I claim is:

1. A detector of blemishes in a surface, including a scanning station, said scanning station and surface being movable relative to one another, the scanning station comprising a laser capable of emitting a continuous beam of radiation, a lens system, located in the path of the beam emanating from the laser, and operable to cause the beam to engage the surface as a line extending for a predetermined length in the direction of said relative motion, and having a width in transverse direction of the same order of magnitude as the smallest blemish to be detected, such beam normally being diffusely reflected by the surface, scanning means including reflector means rotatable in the path of the beam and operable to cause the beam to scan the surface transversely to the direction of said relative motion, and detection means so disposed as to receive radiation diffusely reflected from the surface and operable to provide an output signal indicative of a reduced level of the diffuse radiation when the beam coincides with a blemish.

2. A detector of blemishes as claimed in claim 1 in which the lens system includes two lenses having different focal lengths in two orthogonal planes.

3. A detector of blemishes as claimed in claim 1 in which the lens system includes two spherical lenses in the path of the beam, the first spherical lens providing a divergent beam for the second spherical lens, and a cylindrical lens, also in the path of the beam and between the spherical lenses, to vary the divergence of the beam for the second spherical lens in said one of said two orthogonal planes.

4. A detector of blemishes as claimed in claim 3 in which the position of the cylindrical lens is adjustable between the spherical lenses.

5. A detector of blemishes as claimed in claim 4 in which both spherical lenses are positive power lenses.

6. A detector of blemishes as claimed in claim 5 in which the cylindrical lens is a negative power lens.

7. A detector of blemishes as claimed in claim 1 in which the scanning means comprises a mirror having a plurality of plane reflecting facets.

8. A detector of blemishes as claimed in claim 1 in which a plurality of scanning stations are positioned adjacent each other to give an increased number of scans in any particular length of surface at any given surface speed and scanning speed.

9. A detector of blemishes as claimed in claim 1 in which a plurality of scanning stations are positioned adjacent each other perpendicular to the direction relative motion with the surface to allow a shorter scan length for each station.

* * * * *